United States Patent [19]
Lemelson

[11] 3,944,641
[45]*Mar. 16, 1976

[54] PROCESS OF FORMING AN IRREGULAR SURFACE ON THE INSIDE OF A TUBE OR PIPE

[76] Inventor: Jerome H. Lemelson, 85 Rector St., Metuchen, N.J. 08840

[ * ] Notice: The portion of the term of this patent subsequent to Jan. 28, 1988, has been disclaimed.

[22] Filed: Jan. 2, 1973

[21] Appl. No.: 319,985

Related U.S. Application Data

[63] Continuation-in-part of Ser. No. 68,724, Sept. 1, 1970, Pat. No. 3,708,253, which is a continuation-in-part of Ser. No. 142,405, Oct. 2, 1961, Pat. No. 3,422,648.

[52] U.S. Cl. ............. 264/70; 264/145; 264/150; 264/167; 264/173; 425/381; 425/465; 425/466
[51] Int. Cl.² ............................................ B29D 23/04
[58] Field of Search ........... 264/167, 150, 151, 209, 264/DIG. 52; 425/325, 465, 466, 393, 381

[56] References Cited
UNITED STATES PATENTS

| | | | |
|---|---|---|---|
| 2,814,071 | 11/1957 | Allan et al. | 264/209 |
| 3,193,604 | 7/1965 | Mercer | 264/167 |
| 3,312,766 | 4/1967 | Stevens | 264/167 |
| 3,410,933 | 11/1968 | Moseley, Jr. | 264/209 |
| 3,443,277 | 5/1969 | Frielingsdorf | 264/70 |
| 3,479,422 | 11/1969 | Zavasnik | 264/167 |
| 3,496,605 | 2/1970 | Onaka | 264/312 |
| 3,587,281 | 6/1971 | Lemelson | 425/465 |
| 3,613,162 | 10/1971 | Talsma | 425/466 |
| 3,666,389 | 5/1972 | Nelson | 425/381 |
| 3,705,779 | 12/1972 | van Zon | 264/167 |

*Primary Examiner*—Robert F. White
*Assistant Examiner*—James B. Lowe

[57] ABSTRACT

An apparatus and method are provided for forming tubing and pipe with the inside surface of the pipe wall shaped irregularly for the purpose of either reducing boundary layer drag of a fluid flowing through the pipe or for anchoring a protective lining within the pipe. The apparatus includes an extruder having a die and a mandrel extending through the die for defining the inside surface of the extrusion. In one form, the mandrel is longitudinally oscillated to form circular serrations in the wall of the extrusion formed over the mandrel. In another form, the mandrel is rotated to provide circular or spiral serrations in the wall of the pipe. In yet another form, an electromagnetic field is generated and is varied in intensity in the vicinity of the extrusion die so as to cause variations in the dimensions of either or both the die and the mandrel located therein for varying the surface configuration or roughness of both the internal and external surfaces of the tube or pipe extruded through the die.

5 Claims, 4 Drawing Figures

PROCESS OF FORMING AN IRREGULAR SURFACE ON THE INSIDE OF A TUBE OR PIPE

RELATED APPLICATIONS

This is a continuation-in-part of application Ser. No. 68,724 filed Sept. 1, 1970, now U.S. Pat. No. 3,708,253 which was copending with application Ser. No. 734, 658 filed June 5, 1968 now U.S. Pat. No. 3,587,281 which is a continuation-in-part of application Ser. No. 142,405 filed Oct. 2, 1961, now U.S. Pat. No. 3,422,648.

SUMMARY OF THE INVENTION

This invention relates to an apparatus and method for operating on extrusions as or immediately after they are formed so as to surface roughen or form striations in one or more surfaces thereof. If the extrusion so formed is a tube or pipe, the surface roughness or striations may serve either or both the functions of more firmly anchoring a coating material or lining to the inside surface of the pipe when applied thereafter or reducing the boundary layer drag which is experienced when a gas or liquid is flowed through the pipe.

It is known in the art to surface roughen plastic and metal pipe, tubing and the like so as to condition the surface thereof to either more efficiently receive and anchor a coating or liner thereagainst or to reduce resistance to flow to a fluid through the pipe.

Heretofore, the operation of surface roughening or preparing the inside wall of a pipe or tube has been effected by manual or automatic means operating on the surface of the pipe after it has been formed to shape and cut to length. Such an operation or operations are both costly and time consuming as they are secondary to the main operation of forming the pipe and require rehandling the cut lengths of pipe and the movement of one or more tools through the center of the pipe while the pipe is held stationary in a special fixture.

The instant invention is concerned primarily with an apparatus and method for surface roughening, striating or otherwise forming grooves in the surface of the interior of a pipe extrusion and in certain instances, in the exterior thereof or in the surface of otherwise shaped extrusions, preferably as or immediately after they are formed to shape so that secondary operations to effect such surface shaping are eliminated. In one form of the invention, an extrusion die mandrel is provided over which the pipe or tube is extrusion formed to shape. A portion of the mandrel at or near the end thereof is irregularly shaped and is operable to irregularly shape the freshly formed tubular extrusion by longitudinally moving the mandrel within the die. In another form, the irregularly shaped mandrel is rotationally moved within the die to spirally or circularly shape grooves or striations in the surface of the wall of the pipe or extrusion formed over or against the mandrel. In yet another form, tooling mounted on the mandrel is projectible therefrom against the surface of the extrusion immediately adjacent the mandrel and forms grooves, striations or other configurations in the surface stratum thereof. In still another form of the invention, the mandrel and/or die are caused to vary in dimension by intense magnetic fields generated in the vicinity thereof and varied during extrusion so as to cause a variation in the shaping of the extrusion along its length.

Accordingly, it is a primary object of this invention to provide a new and improved apparatus and method for forming and shaping extrusions either as they are formed within the extrusion die or immediately after they leave the die.

Another object is to provide an apparatus and method for forming an extrusion after it has been shaped in a die and while still in an easily deformable condition before it has completely set or solidified so as to facilitate the operation.

Another object is to provide an apparatus for variably shaping an extrusion by magnetically deforming the die in which the extrusion is formed and varying its configuration by varying the magnetic field in a known manner during extrusion.

Another object is to provide means for varying or controlling the surface roughness of an extrusion, as it is extruded to shape, by variably stressing and changing the configuration of an extrusion die through which the extrusion is passed.

With the above and such other objects in view as may hereinafter more fully appear, the invention consists of the novel constructions, combinations and arrangements of parts as well as methods of fabrication which will be more fully described and illustrated in the accompanying drawings, but it is to be understood that changes, variations and modifications may be resorted to which fall within the scope of the invention as claimed.

Figure 1:
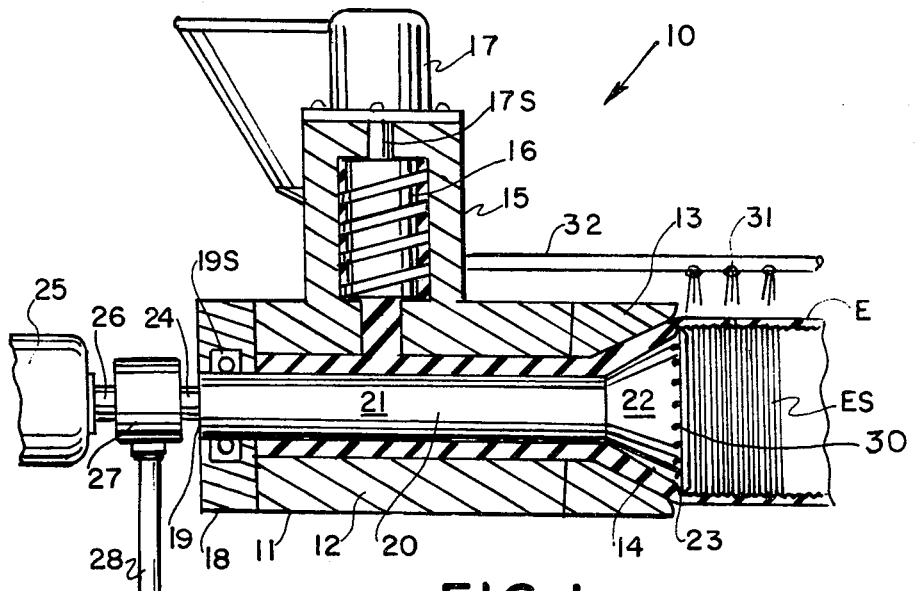
FIG. 1 is a side view with parts broken away for clarity of an extrusion apparatus having an extrusion die and mandrel with means for moving the mandrel during the extrusion operation.

There is shown in FIG. 1 an extrusion apparatus 10 which includes an extruder 11 for an extrusion flowable material such as a plastic or ceramic material flowed into an extrusion chamber 11 which is defined by a circumscribing wall 12, by means of an extrusion screw 16 located within a branch chamber 15 which communicates with the chamber 11. A suitable conventional drive motor 17 has its output shaft 17S connected to the shaft of the screw 16 and operates to rotate said screw for feeding material introduced into the branch chamber 15 from a remote source [not shown] into the chamber 11 through which it flows over a mandrel 20 which extends longitudinally through the chamber 11 as an elongated shank 21 which passes through the extrusion die 13 located at the end of the chamber wall 12. The end 22 of the mandrel 20 is enlarged and tapers outwardly as shown. A circular lip 23 circumscribes the head or end 22 of the mandrel and is shaped to define the inside surface of the tubular extrusion E formed between the mandrel and the die as it passes from the extruder.

The lip 23 is so configured and located that it may cooperate with the end of the extrusion die 13 in varying the shape of the surface stratum of the tubular extrusion, depending on the longitudinal location of the mandrel with respect to the die. In other words, slight variations in the inside diameter of the tubular extrusion E may be effected by longitudinally moving the mandrel 20 a slight degree towards and away from the inside surface of the die 13 located adjacent the lip formation 23.

Accordingly, the mandrel 20 is shown extending completely through the chamber 11 and an opening 19 in an end wall 18 of the chamber. A seal 19S is located between the end wall and the surface of the mandrel 20 to prevent outflow of extrusion material and a portion 24 of the mandrel protrudes beyond the end wall which portion is coupled to the shaft 26 of a suitable lineal actuator 25 which is operable to move the mandrel 20 a predetermined degree back and forth within the extrusion chamber and die.

The lineal actuator 25 may be of any suitable design and may comprise an electric motor with a suitable mechanism connected thereto for providing oscillating longitudinal movement of its output shaft, an air or hydraulic motor or ram, the piston of which may be pulsed by variably applying fluid pressure thereto, a solenoid which may be of the bi-stable or mono-stable type which may be intermittently operated to intermittently drive the mandrel 20 back and forth within the extrusion chamber or a transducer such as a piezoelectric transducer or magnetostrictive transducer operable to oscillate the piston longitudinally a brief degree for variably forming the inside surface of the tubular extrusion and provide circular discontinuities ES therein defining a plurality of parallel non-connected discrete circular formations therein as it flows over the head of the mandrel by the described cooperation between the lip 23 and the surface 24 of the die.

The degree and frequency of movement of the mandrel will, of course, be a function of the desired change in shape of the wall of the extrusion considered in view of the configuration of the mandrel, the lip and the extrusion die as well as the rate of flow of extrusion material through the extruder. For slight displacements of the mandrel very fine striations, say in the range of .0005" to .005" in depth and separation an circular figuration, may be formed in the surface stratum of the tubular extrusion which may be used as means for roughening the tube wall to receive a coating or liner tube expanded therein or to reduce the boundary layer drag by creating local turbulence in the flow of a fluid through the tube. Depending on the diameter of the tube, striations of greater depth and separation from each other may be similarly formed by the provision of a suitable actuator and mechanism associated therewith for longitudinally moving the mandrel during extrusion.

In another form of the invention, illustrated in FIG. 1, the lineal actuator 25 may be operable to rotate the mandrel 20 within the extrusion chamber during extrusion and the lip formation 23 at the end of the mandrel may comprise a single protrusion or irregular formation in the mandrel which is operable to deform the tubular extrusion with a spirally shaped groove or striation, the separation of which would be a function of the rate of flow of extrusion material over the mandrel and the velocity of rotation of the mandrel.

In another form, the lip 23 may be replaced by a plurality of protrusions located at or near the end of the mandrel which either cooperate in forming a single groove in the wall of the extrusion or which form separate grooves, one next to the other, in the wall of the extrusion as the mandrel rotates.

Figures 2, 3:
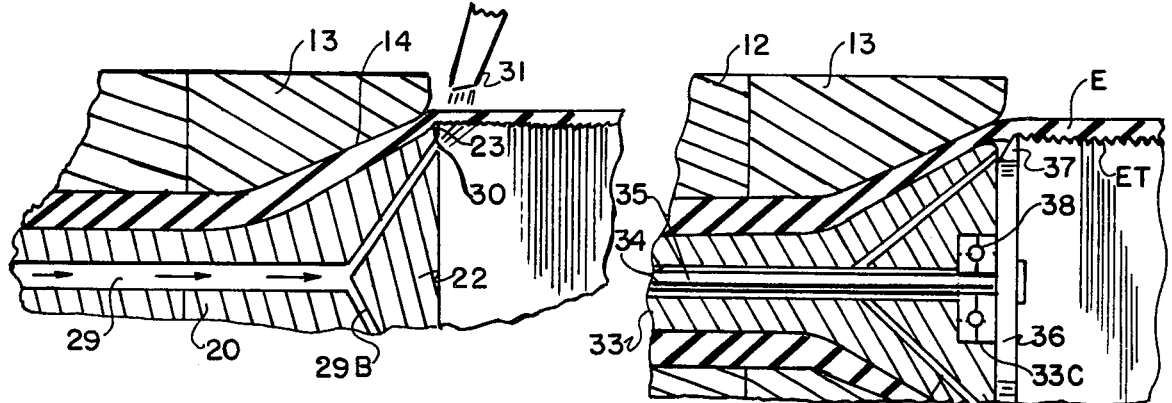
FIG. 2 is a side view with parts broken away for clarity of a portion of an extrusion apparatus which is a modification of that shown in FIG. 1 and which employs electromagnetic means for varying the configuration of either or both the die and mandrel located within the die.

Also shown in FIGS. 1 and 2 is a passageway extending through the mandrel for conducting a heat transfer fluid such as air, a refrigerant to branch passageways terminating at the end of the mandrel. The central passageway 29, shown in detail in FIG. 2 extends centrally through the mandrel 20 from a rotary coupling 27 connected to the portion 24 of the mandrel protruding from the end wall 18 of the extrusion chamber. A tube 28 extending from a source of pressurized heat transfer fluid, conducts said fluid to the coupling, from which it flows to branch passageways 29B in the head end 22 of the mandrel and is expelled out openings 30 at the end of the mandrel and flowed against that portion of the extrusion E which has just been deformed by the lip 23 to rapidly set same to retain the deformations therein substantially as they are made or in a modified configuration. The coupling 27 is either adapted to move longitudinally with the mandrel 20 or remain stationery while the mandrel slidably moves back and forth therein. One or more nozzles 31 may be disposed around the extrusion E for flowing heat transfer fluid such as gas or liquid to effect the rapid setting thereof and the retention of the deformations in the surface stratum of the inside of the extruded tube.

If the tubular extrusion E is directed upwardly as it forms (e.g. the extrusion chamber has its longitudinal axis directed vertically), then a heat transfer liquid such as cool water may be directed through one or more passageways in the mandrel, circulated to a certain depth within the extrusion portion disposed above the mandrel and returned to other passageways having openings at the end of the mandrel and flowed therethrough to another rotary coupling near the far end of the mandrel so as to rapidly cool and set the tubular extrusion without the need to flood the exterior thereof with coolant. If the extrusion is made of a thermosetting resin, the fluid so circulated may be a heated fluid capable of transferring sufficient heat to the tubular extrusion to either set or substantially set the material thereof as it travels upwardly. If the material extruded is a metal such as aluminum, it may not be necessary to rapidly cool the extrusion to retain the grooves or serrations formed on the inside surface of the extrusion. FIG. 1 shows a pipe 32 supported above the extrusion E and supporting a plurality of nozzles 31 which direct heat transfer fluid against a length of the extrusion.

In FIG. 3 tooling in the form of a rotatable blade or disc 36 is provided at the end of an extrusion mandrel 33 of the type described, and is shaped with a cutting or deforming portion 37 adapted to rotate against and form a spiral thread-like groove ES in the surface stratum of the inside wall of the extrusion E. The blade or offset disc 36 is rotatably supported on a ball bearing 38 which is retained within a cavity 33C in the head 33H of the mandrel 33. The blade or disc 36 is power rotated on a shaft 35 which passes through a bore 34 extending longitudinally through the mandrel from the end thereof which extends beyond the far end of the extrusion chamber and is connected to a constant speed drive motor (not shown) for rotating same. The motor driving shaft 35 may also be situated within a cavity in the mandrel. The thread ET formed by tool 36 may comprise a fine spiral groove for reducing boundary layer drag for fluid flowing through the pipe or may be dimensioned to serve as a retainer for a male threaded fitting or plug. Said thread may also be selectively applied to the inside surface of the tubular extrusion E by providing means within or at the end of the mandrel for advancing and retracting the tool 36 in a radial direction towards and away from the wall of the extrusion as it is rotated or as the mandrel rotates carrying said tool in a circular path at the end thereof. Thus tooling which is more complex than shown, may be supported for rotation and/or radial movement at the end of the mandrel or may be rotated with rotation of the mandrel by a constant speed drive means secured to the end thereof which protrudes from the far end of the chamber.

Also shown in FIG. 3 are a plurality of outwardly extending passageways 39 connected to the center passageway 34 or bore through which shaft 35 also extends for flowing heat transfer fluid as described to openings in the end of the mandrel for flowing same against the extrusion as it leaves the end of the extrusion die. It is noted that the passageways 29B and 39 of FIGS. 2 and 3 may be used to conduct a coating fluid or plastic and spray or extrusion coat same against the entire or selected portions of the inside surface of the tubular extrusion.

In yet another form of the invention, it is noted that the mandrel head 22 of FIG. 1 may be segmented with at least one portion thereof containing the serrating or threading tool or lip cantelever supported on the mandrel and operable to be projected outwardly to engage or deform or machine in the inside surface of the extrusion wall when so projected against the extrusion. Reference is made to FIGS. 1 and 2 of parent application Ser. No. 68,724, now U.S. Pat. No. 3,708,253 for details of an expanding mandrel head structure which may be modified with a threading or serrating peripheral lip to perform the functions described herein and to provide a threaded formation along all or selected portions of the extruded tube wall. The mandrel may also be shaped and operable as in FIGS. 1 and 2 of said copending application, to bell or expand predetermined portions of the extruded tube to facilitate the joining of sections thereof together after they are cut to length.

In still another form of the invention, gas such as air ejected at high velocity from the passageways 29B or 39 of the mandrels illustrated either as a steady streams or pulses thereof, may operate to deform the freshly formed tubular extrusion with cavities, threading, channels or serrations as described.

Figure 4:
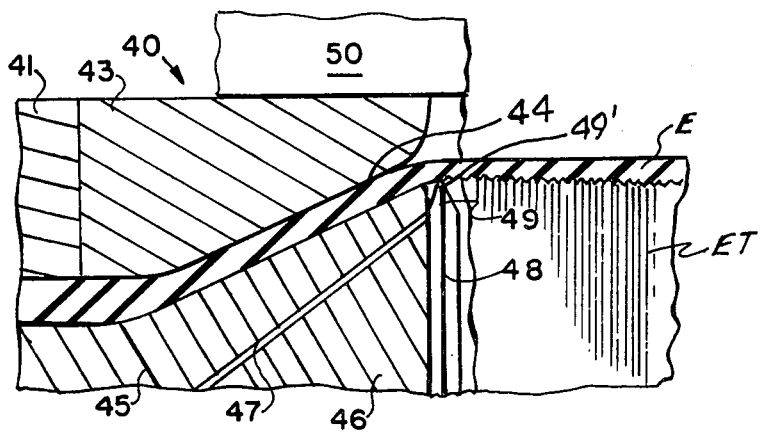

In FIG. 4 is shown yet another arrangement for serrating or surface roughening the inside surface of a tubular extrusion E as it is formed. The apparatus 40 includes an extruder 41 having a die 43 with a die opening 44 in which extrudate such as a polymer is formed to shape over a mandrel head 46 extending from a mandrel 45 supported in the extrusion chamber. Secured to the end of the mandrel head 46 is a circular disc 48 of ferro-magnetic material. The periphery 49 of the disc 48 is shaped with a sharp edge 49' which normally penetrates the inside surface of the tubular extrusion E. Disposed around the die 43 is a circular electromagnet 50 having a sufficient number of field windings of wire to generate an intense enough magnetic field when energized with a suitable source of electrical energy to cause the disc 48 to deform and vary the radial location of the circular edge 49' of disc 48. Thus by applying current intermittently to the electromagnet 50 or applying suitable alternating current thereto, the disc 50 may be made to variably perform on the inside surface of the extrusion E and form fine serrations or undulations therein. The electro magnet 50 may also be operable to cause variations in the dimensions of the die 43 and/or mandrel head 46 with or without causing variations in the disc 48 depending on the relative materials employed and their dimensions, so as to provide fine surface stratum variations in the extrusion's inside wall portion. Accordingly, if the disc 48 is eliminated, a lip may be provided at the periphery of the mandrel head 46 to variably form the extrusion with fine serrations ET as described while coolant ejected from a plurality of holes 47 through the mandrel may be employed to rapidly set the extrudate and retain the deformations therein.

I claim:

1. A method of providing a plurality of irregular discrete formations along the inside surface of a tube comprising the steps of:

forming tubing on a continuous basis in an extrusion die by causing an extrudate to pass over tooling including a die mandrel which engages the inside surface of said tubing immediately after it is formed in said die, and operating said tooling to cause said mandrel to longitudinally move back and forth within said die to variably engage the inside surface of said tubing while the material thereof is in an easily formable condition so as to variably work the inside surface stratum of the wall of the tubing and to form a plurality of parallel circular nonconnected irregular formations therein which formations are composed of elongated cavities and ridges wherein the cavities are in the range of about .0001 to .010 deep and extend along the inside surface of the tubing.

2. A method in accordance with claim 1 wherein the mandrel is longitudinally moved by imparting variable magnetic force thereto.

3. A method in accordance with claim 1 wherein said tooling includes a radial lip at the end of the mandrel, said method including causing said lip to cooperate with the surface of the extrusion die in shaping the tubing.

4. A method in accordance with claim 3 including longitudinally moving said mandrel back and forth to cause said lip to variably engage and shape the inside surface of the tubing.

5. A method in accordance with claim 1 wherein said tooling includes said die and means for varying the configuration of said die during extrusion, said method including varying the configuration of the die at a frequency to vary the inside shape of the tubing formed therein.

* * * * *